United States Patent [19]
Gass

[11] Patent Number: 5,651,004
[45] Date of Patent: Jul. 22, 1997

[54] METHOD AND FACILITY FOR COMMUNICATION BETWEEN PACKET MODE SUPPORTING UNITS IN THE CORE OF A COMMUNICATIONS INSTALLATION

[75] Inventor: Raymond Gass, Bolsenheim, France

[73] Assignee: Alcatel N.V., Amsterdam, Netherlands

[21] Appl. No.: 99,558

[22] Filed: Jul. 30, 1993

[30] Foreign Application Priority Data

Aug. 7, 1992 [FR] France ................................ 92 09838

[51] Int. Cl.⁶ .................................................. H04L 12/46
[52] U.S. Cl. ........................ 370/396; 370/402; 370/407; 370/410
[58] Field of Search ................ 370/60, 60.1, 85.13, 370/85.14, 58.1–3, 94.1, 94.3, 85.2, 85.3, 110.1, 68.1, 389, 390, 392, 400, 396, 399, 402, 407, 410, 522; 340/825.5, 825.08, 825.07

[56] References Cited

U.S. PATENT DOCUMENTS

| | | | |
|---|---|---|---|
| 4,491,945 | 1/1985 | Turner | 370/60 |
| 4,611,322 | 9/1986 | Larson et al. | 370/60 |
| 4,617,657 | 10/1986 | Drynan et al. | 370/60 |
| 4,707,828 | 11/1987 | Yamada | 370/60 |
| 4,933,931 | 6/1990 | Kokubo | 370/60 |
| 5,029,161 | 7/1991 | Nagashima | 370/60 |
| 5,329,527 | 7/1994 | Ujihashi et al. | 370/85.13 |
| 5,459,455 | 10/1995 | Sato | 370/85.2 |

FOREIGN PATENT DOCUMENTS

| | | |
|---|---|---|
| 0468442A1 | 1/1992 | European Pat. Off. |
| 0474066A1 | 3/1992 | European Pat. Off. |
| WO8400266 | 1/1984 | WIPO |

OTHER PUBLICATIONS

French Search Report FR 9209838 dated Apr. 20, 1993.

*Primary Examiner*—Douglas W. Olms
*Assistant Examiner*—Chau T. Nguyen
*Attorney, Agent, or Firm*—Sughrue, Mion, Zinn, Macpeak & Seas

[57] ABSTRACT

A method and a facility for communication between packet mode supporting units interconnected in the core of a communications installation by point-to-point links that are physically structured and time governed in identical manner, a packet being transmitted between two packet mode support units of the installation after the unit desiring to transmit has previously sent a request to the destination unit and the destination unit has responded with a corresponding acknowledgment. The communications facility constitutes a distributed type asynchronous switch in which each packet mode support unit includes a packet communication circuit to which the point-to-point links terminating at the unit are connected via a switching module. The communication circuit conditions each of the packets that is to be transmitted to another packet mode supporting unit of the installation in the form of a sequence of cells, and also performs inverse conditioning.

10 Claims, 2 Drawing Sheets

METHOD AND FACILITY FOR COMMUNICATION BETWEEN PACKET MODE SUPPORTING UNITS IN THE CORE OF A COMMUNICATIONS INSTALLATION

The invention relates to a method and a facility for communication between packet mode supporting units that are interconnected point-to-point within a communications installation.

BACKGROUND OF THE INVENTION

It is already known from Applicant's own prior publication to provide an interconnection network for the core of an integrated services digital type network whereby the specialized modular units constituting the core are interconnected point-to-point, as a function of their communication requirements.

Such a network is designed to incorporate a sub-network relating to units that support packet mode, i.e. units within the core that are directly or indirectly involved whenever packet form data is switched. Conventionally, such data packets are switched by switches having a centralized structure in a bus or loop distributed network, each switch including a memory in which incoming packets are temporarily stored until the moment they are forwarded to destinations that depend on address information contained in their respective headers.

SUMMARY OF THE INVENTION

The invention provides a communications method between packet mode supporting units interconnected in the core of a communications installation by point-to-point links that are physically structured and time governed (controlled) in identical manner, wherein a packet is transmitted between two packet mode supporting units of the installation by the unit, desiring to transmit the packet, previously sending a request concerning the packet to the destination unit, and by the destination unit responding by means of a corresponding authorization for the packet.

The invention also provides a communications facility (installation) between packet mode supporting units in the core of a communications installation that are interconnected by point-to-point links forming a communications sub-network where all of the links are physically structured and time governed (controlled) in identical manner, the facility constituting a distributed type asynchronous switch where each packet mode supporting unit, regardless of whether it is of the control unit type, of the auxiliary unit type, or of the coupler unit type for communications terminals and/or stations, includes the same type of packet communication circuit to which the point-to-point links terminating at the unit are connected via a switching module to condition each of the packets to be transmitted from the unit including said circuit to another packet mode supporting unit in the installation in the form of a sequence of cells, and also to ensure that the unit including said circuit can build up a packet from the corresponding cells the unit receives over any one of the point-to-point links connected to said unit.

BRIEF DESCRIPTION OF THE DRAWINGS

The invention, its characteristics, and its advantages, are given in greater detail in the following description made with reference to the accompanying drawings, in which.

MORE DETAILED DESCRIPTION

Figure 1:
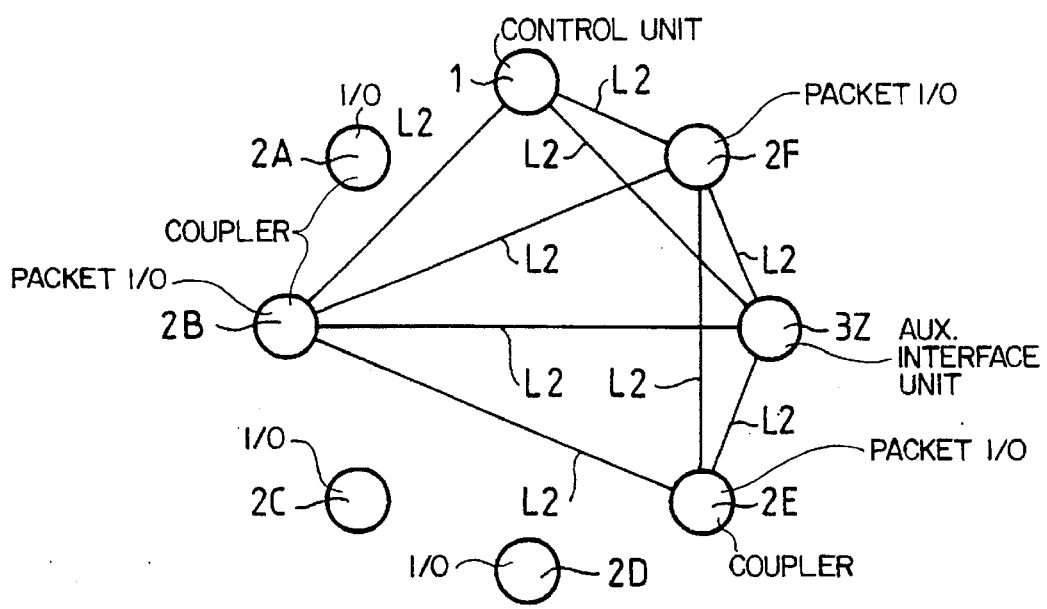
FIG. 1 is a block diagram of an example of an interconnection sub-network between units supporting packet mode in an integrated services digital type communications installation as described in the aforesaid Prior Publication.

As already specified in above-mentioned Prior Publication, units forming the core of an installation that includes a packet sub-network in accordance with the invention are assumed to be implemented on individual circuit cards (not shown) designed to be grouped together within a single structure, e.g. of the cabinet or rack type.

In a first embodiment, the various cards carrying core components are interconnected by point-to-point links carried by a motherboard type card to which the other cards are connected via positions on the card including suitable connection members. It is also possible to associate a plurality of installation core type assemblies as defined above so as to make up an assembly of greater size: however that is not described further herein.

An installation generally includes at least one card carrying a control unit 1 which is organized around at least one processor associated with a set of read only memories (ROMs) and/or read/write memories (RAMs), which components are well known to the person skilled in the art and are not shown herein.

An installation also includes individual cards allocated to input/output units or "couplers" 2, such as those referenced 2A to 2F and which are designed to allow information to be interchanged between communications instruments such as sets, terminals, or any other user or data-supplying equipment, e.g. equipment of the server type.

These known communications instruments which are not shown herein may depend in conventional manner either directly from the installation via communications links (usually wires), or else indirectly via ties connecting the installation to other installations from which some of the instruments then depend.

These said other installations and the ties serving them are not directly concerned by the present invention and they are neither shown nor described herein. The same applies to the links connecting the couplers to the communications instruments that may depend from them.

An installation generally includes one or more auxiliary unit cards such as 3Z, which auxiliary units provide functional assistance to the other units 1 or 2 in the performance of some of their operations, in particular by providing at least some of the units with a bridge function to a subsystem that is identical or compatible, or for providing a specific management function on behalf of the other units in the installation.

As mentioned above, each unit 1, 2, or 3 is connected by means of point-to-point type links to the units with which it comes into communication within the installation.

Each point-to-point link between two units is designed to be adapted to the specific needs of the units that it interconnects and, as a result, it may be constituted and managed in a manner that is totally different from the other links in the installation, should that be required.

The units that participate in the packet sub-network in the present invention are, for example, a control unit 1, three of the couplers 2B, 2E, and 2F via which information transmitted in packet mode passes, and an auxiliary interface unit 3Z providing access to packet mode for units that do not directly support packet mode themselves.

The units interconnected by the packet sub-network are characterized in that together they constitute a distributed asynchronous switch in which each unit is its own master for the packets passing through it.

The units 1, 2B, 2E, 2F, and 3Z of the packet sub-network are connected to one another via point-to-point links referenced L2 which are made up identically and which are governed identically.

At least some of these units are also connected to other units of the installation by links that are not shown and that are governed differently, even if such links happen to have the same physical structure.

In one particular embodiment, each of the links L2 comprises four separate conductors that may be implemented, for example, in the form of four adjacent parallel tracks on the motherboard, just like the four conducting tracks of the links between units that implement circuit mode, as described in the Prior Art.

The units 2B, 2E, and 2F are taken to represent different packet type couplers, e.g. a coupler enabling the installation to be connected to a token type network for unit 2B, or couplers enabling the installation to be connected to one or more Ethernet type networks, for units 2E and 2F.

Figure 2:
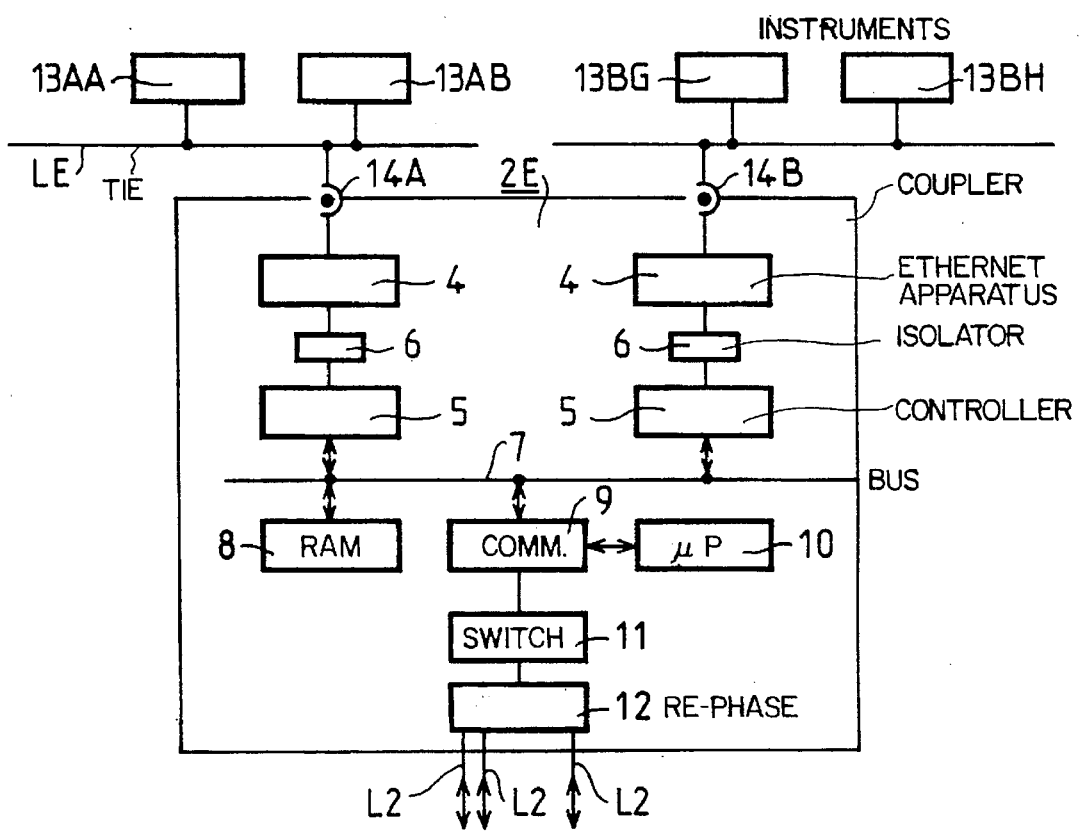
FIG. 2 is a block diagram of a coupler type unit provided in the present invention for association with network links of the Ethernet type.

FIG. 2 is a block diagram of an example of one of the units, and in this case the unit is unit 2E which is taken as being individually connected to two Ethernet ties LE via two appropriate data transmitter/receiver apparatuses 4.

Each apparatus 4 may be a conventional model for this type of network, and is connected to a communication controller 5 via an isolator 6.

For the unit 2E in which it is included, each of the controllers 5 manages interchanges with the corresponding Ethernet tie via a transmitter/receiver apparatus 4.

This management implies, in particular, that each controller 5 can determine the destination of a packet as transmitted to the installation via the tie LE to which it is connected, on the basis of the data contained in the header of the packet, so as to be able to forward said packet. Communications operations in the opposite direction as constituted by injecting packets on a tie LE from the installation are also provided by the controller associated with said tie.

Three forwarding options coexist within a single unit depending on the destination of the packet received via a tie LE: firstly, if an incoming packet is destined for a communications instrument connected to the same tie access as the access from which the packet was received, there is no need for the receiving unit to take any action or to perform any forwarding.

If the incoming packet is destined for a communications instrument that depends from another access of the receiving unit and that is designed for a tie of the same type as that over which the incoming packet is received, then a local transfer takes place within the unit without the unit taking any action on the packet it forwards.

If an incoming packet is destined for a communications instrument that does not depend from a tie such as LE having direct access to the receiving unit, then a transfer must take place between two units of the packet sub-network of the installation via one of the links L2.

The unit which has received the packet in question then acts on said packet so as to put it into a form enabling it to be conveyed via one of the links L2, so as to satisfy the process and constraints that relate to such a link.

As recalled above, any information sent in packet mode to an installation via a tie such as the tie LE which operates as an Ethernet tie must be preceded by a header, e.g. in compliance with standard IEEE 802, which header is transmitted at the beginning of each packet and includes the source and destination addresses of the packet.

As mentioned above, these addresses are read by the controller 5 which sees the packet on arrival, and they are stored in a correspondence table in a buffer memory 8 of the unit together with the addresses corresponding to the tie subunit (or controller 5) via which the packet reached the unit.

Thus, as and when each of the communications instruments connected to the unit sends packets to the unit, the unit makes a record of the instruments, to which it is connected, that are capable of serving as sources of packets.

Thus, for example, if a communications instrument 13AA of an Ethernet network transmits packets to the unit 2E via an access 14A of said unit which is connected to the Ethernet tie LE (FIG. 2), then the unit 2E takes the source address corresponding to the communications instrument 13AA as provided by the header of the first packet received from said instrument, and registers it in association with the local address within the unit that physically marks the access 14A via which said packet arrived.

These local access addresses relating to a unit may optionally also mark the ties or links that terminate at said unit via its accesses.

Each unit of the packet sub-network is thus capable of determining whether an incoming packet comes from a communications instrument that has already been cataloged merely by comparing the source address relating to said instrument and contained in the packet header with the source addresses that have already been stored.

Insofar as the header of each packet received via a first access of a unit for forwarding through an installation also contains a destination address, provision is made for recording in the translation table of the receiving unit the address of the second access of the installation via which the designated communications instrument may be reached by a packet passing through the installation.

This recording is performed as soon as the path that is to be used in the installation has been determined for a given source address and a given destination address, and it is thereafter used by the unit for controlling the switching module 11 that it includes and for making up the various routing headers that apply to all new packets coming from the same source and going to the same destination.

Thus, in each case, each packet sub-network unit examines the header of each of the packets it receives from a tie via each of its tie accesses for the purpose of determining by comparison whether the received destination address in a packet header corresponds to a destination address that is known to the unit since it has already been received and is still recorded, or whether said address should be considered as being unknown to said unit.

It may be preferable to retain only those addresses that are used most frequently and to eliminate addresses that have not been used for a given time lapse.

When the destination address and the source address appearing in the header of an incoming packet both correspond to a respective pair of addresses that have already been stored in the unit, i.e. a destination and a source, then the unit uses its correspondence table for transferring the incoming packet in question under circumstances that are explained below.

In application of the above explanation, use of the correspondence table may lead to no action being taken by the unit, for example if the destination can be reached via the same tie as the tie over which the packet reached the unit, as may happen for example if the communications instrument acting as the source, e.g. 13AA, and the instrument acting as the destination, e.g. 13AB, are both served by the same tie LE of a token network (see FIG. 2).

In contrast, use of the table leads to action being taken by the packet communication circuit 9 which behaves like an interface on successively transmitted packets that need to pass from one or other of the ties, e.g. LE, to one or other of the links L2, or vice versa.

When the destination address of a received packet is not already known, as happens each time a communications instrument transmits to a destination with which it has not communicated (at least not recently), then the unit receiving the packet must take steps to determine what it needs to do to ensure that the packet is forwarded appropriately.

To this end, any packet sub-network unit finding itself in this situation is capable of broadcasting the packet, either in full or in part depending on its length, via the links L2 and the tie(s) connected thereto.

Whenever packets are transmitted over ties such as LE taken herein to be Ethernet ties, by way of example, they are processed for the purpose of determining a forwarding path under the control of procedures that are provided elsewhere for this purpose and that are therefore not described in greater detail herein.

At least a portion of a packet sufficient for determining a transmission path via one of the links L2 between the units of the packet sub-network of the installation is broadcast in a manner that is explained in greater detail below and that is used herein by each of the units concerned for the purpose of recording the various communications instruments that are accessible via each of the links L2 connected to the unit, the supplied source address being associated for subsequent use with the address that marks the access within the unit at which the link L2 transmitting the packet terminates.

However, when a packet is conveyed in full or in part between two units of the packet sub-network of an installation, account must be taken of the constraints specific to said installation, and, for example, a multiservice type installation comprises an association of independent specialized sub-networks that interconnect units some of which are capable of being served by more than one of the sub-networks, because of the functions they perform.

According to the invention, provision is made for associating additional address information with each packet that is to be conveyed via a link L2 of the packet sub-network, for the purpose of enabling the packet to be properly forwarded towards the link L2. For example, this additional address indication may be provided by the controller 5 that processed the packet in question.

In the packet sub-network units envisaged herein, additional address information is associated with a packet received via a transmitter/receiver apparatus 4 by means of a communication circuit 9 that is also responsible for preparing said packet for forwarding via the link L2 in the installation.

In the embodiment shown in FIG. 2, a common bus 7 interconnects the controllers 5 of the apparatuses 4 in the unit 2E with the read/write memory 8 which also serves as a buffer for data interchanges and with the communication circuit 9 which manages access to the point-to-point links L2 that terminate at the unit 2E in the installation.

The communication circuit of a unit is taken to be supervised by a processor 10 and it is connected to a switching unit 11 suitable for using the additional address information associated with the packets received from the transmitter/receiver apparatuses 4 for the purpose of forwarding said packets to that one of the connected links L2 that is to be taken.

In conventional manner, a re-phasing interface 12 is inserted between the switching module 11 and the links L2.

For example, the switching module 11 may be a known wideband switching element provided with sixteen two-way accesses. In such an element, provision is made for space-division switching of the cells it receives at its inputs once it has translated their respective headers so as to apply them to the appropriate outputs.

Thus, by way of technical compromise, any packet P to be transmitted between units of the packet sub-network of the installation are split up into cells whenever their length exceeds the maximum acceptable length for a cell, and in turn this means that the unit must be capable temporarily of storing the cells of packets that are being transmitted.

Figure 3:
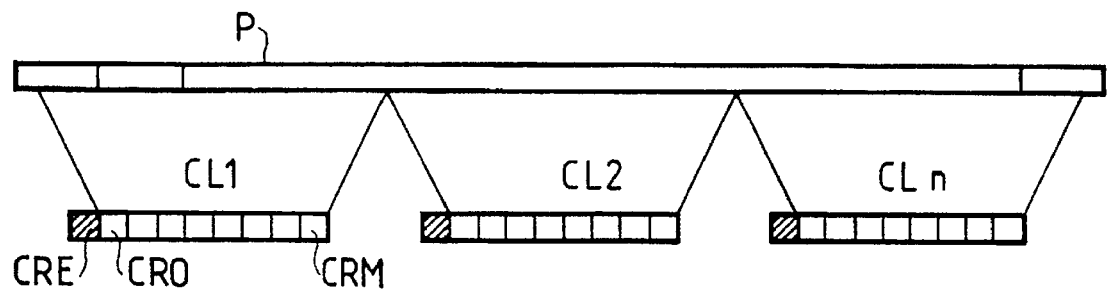
FIG. 3 shows one example of packet transmission structure for a packet mode supporting sub-network.

In one embodiment, provision is made for implementing cells such as CL1, CL2, CLn as shown in FIG. 3, each made up of a limited number of elements each having the same number of bits, e.g. sixty-eight, each cell including, for example, a header element CRE followed by a maximum number "m" of packet data transmission elements CR, where "m" may be set at eight, for example.

Each element includes a control field and a data field.

Each header element contains, in particular, data for use in routing the cell in which it is included via the switching modules 11 that said cell encounters in the installation, together with data enabling the packet of which the cell forms a part to be reconstituted after it has passed through the installation.

According to the invention, cells are transmitted via point-to-point type links L2 between units of an installation by using a procedure requiring that the unit desiring to transmit sends a request to the unit with which it desires to communicate, and which requires the called unit to respond with an authorization. This makes it possible for a called unit to act on the flow of packet data sent to it.

This action may be managed at low level in the called unit, and is modulated as a function of the processing power available to said unit and as a function of the priorities which apply to it over the course of time, in particular when several units seek to transmit simultaneously to the same called unit.

When the links L2 are of the four-wire type mentioned above, with two wires being reserved for each transmission direction, the calling unit sends its request in its transmission direction over the link L2. The request may be contained, for example, in a special header element.

A unit having several other units seeking to communicate therewith simultaneously itself controls collision between the various calling units and specifies which one of them is temporarily authorized to transmit by sending an authorization to that one.

Each unit has collision-controlling means enabling it in conventional manner (not described below) to select that one of the simultaneous calling units that is to receive an authorization in order to authorize it to send.

The authorization may optionally be transmitted to the selected calling unit in the form of a special element. In another embodiment it is constituted by a signal corresponding to an electrical zero level being applied or not as the case may be on the link wires L2 between the selected calling unit and the called unit, which wires are reserved in the called unit for such transmissions.

On receiving the expected authorization, the selected calling unit sends at least one cell of the packet it has to transmit, with the cell being sent over the link L2 via which said calling unit previously sent its request. Depending on circumstances, continued transmission from the selected calling unit is either a function of the contents of the received authorization element, or else a function of the electrical zero level being maintained by the called unit.

As mentioned above, when the path of a packet received by one of the units in the installation is not clearly determined and the destination unit is consequently not known, provision is made to broadcast a cell that includes, in particular, at least a portion of the header of said packet, which cell is broadcast to all of the units that might constitute a destination.

This implies, at least in theory, that a first cell is established on the basis of packet received by the installation for each of the links L2 connected to the unit that has received the packet, for the purpose of causing each of the units in the packet sub-network to perform a search to determine whether the cell it receives might concern it.

Figure 4:
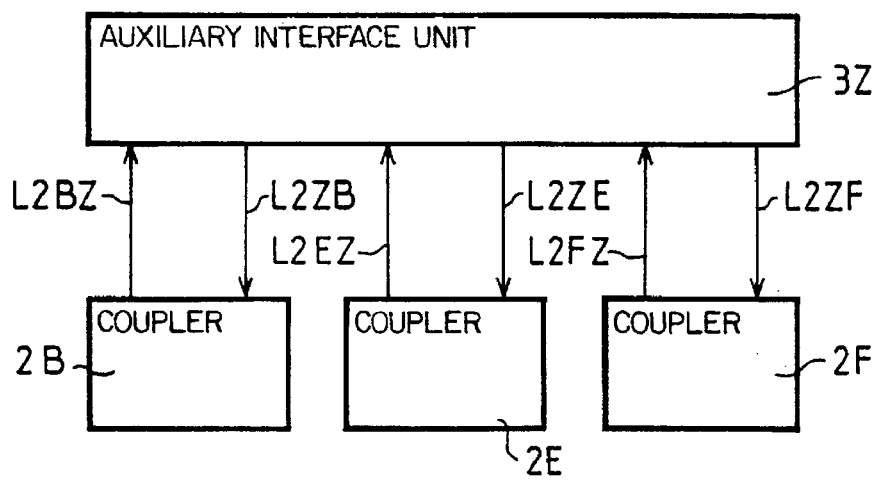
FIG. 4 is a simplified diagram of the packet sub-network.
Figure 5:
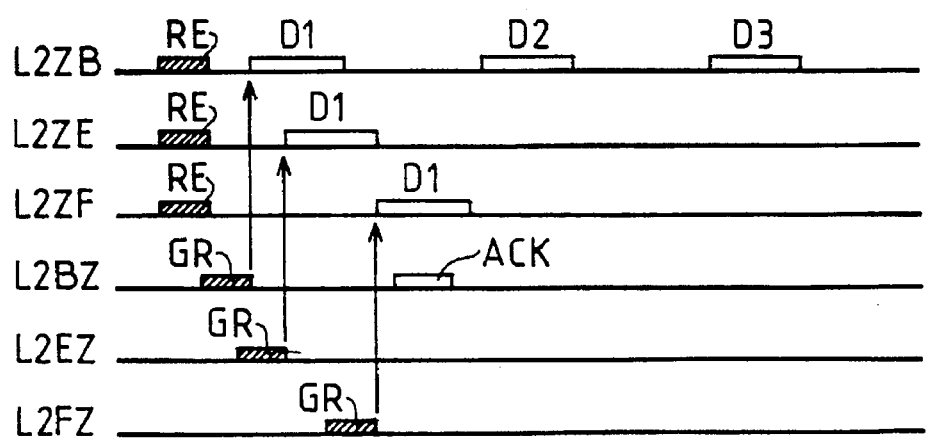
FIG. 5 is a timing diagram explaining how a path is setup for sending a packet through the sub-network shown diagrammatically in FIG. 4.

FIGS. 4 and 5 relate to an implementation for a simple case where only four units 2B, 2E, 2F, and 3Z of the packet sub-network are shown and where a packet whose destination is to be determined is received in the installation via one of these four units, e.g. the unit 3Z.

In this case, provision is made to produce three similar first cells from the packet, e.g. in the communication circuit 9 of the unit 3Z.

Each of these three "search" cells DI differs from the other two by having different additional address information for the purpose of causing the switching module 11 of the unit 3Z to forward it towards a respective different one of the one-way link elements L2 (referenced L2ZB, L2ZE, and L2ZF in this figure) that serve respective units 2B, 2E, and 2F.

First, three requests RE are transmitted simultaneously by the communication circuit 9 of the unit 3Z over elements L2ZB, L2ZE, and L2ZF in order to obtain authorization to transmit GR from each of the units 2B, 2E, and 2F.

Each search cell, referenced D1 in the present case, is then transmitted independently over that one of the link elements L2ZB, L2ZE, or L2ZF designated by its own additional address information, and this takes place as soon as the unit receives the corresponding authorization transmitted in the opposite direction over the one-way element L2BZ, L2EZ, or L2FZ of the corresponding link L2.

The contents of each search cell is processed by the unit it reaches for the purpose of determining whether the designated destination is capable of being reached via said unit, and if this is the case, then the unit, e.g. 2B, returns a special authorization ACK to the unit which broadcast the search cell over the link L2 that interconnects them, L2BZ in the present example. This takes place under conditions analogous to those described above, i.e. in practice, by the destination unit sending a special header element. The path through the installation for the packet can then be considered as being already defined for the remaining cells D2, D3, . . . . that make up the packet.

The broadcast facility mentioned above can also be used for sending the same packet to a plurality of units in the packet sub-network. Each of the destination units independently returns the special header element indicating that it constitutes a destination, once it has received a search cell D1 for the packet that is to be broadcast, so as to ensure that, thereafter, it receives the sequence of cells D2, D3, . . . relating to the packet.

This sequence may be transmitted as many times as there are destination units, or alternatively, it may be broadcast cell by cell to all of the units, depending on traffic and on requirements.

I claim:

1. A communications method of sending packets between packet mode supporting units which are adapted to function both as a transmission unit and a destination unit and which are interconnected in the core of a communications installation by point-to-point links that are physically structured and time governed in identical manner, wherein each of said packets to be sent between a transmitting one and a receiving one of said packet mode supporting units of said core of said communications installation is transmitted according to the steps of:

requesting to transmit a packet, wherein said transmitting one of said packet mode supporting units sends a request concerning said packet to said receiving one of said packet mode supporting units; then authorizing said packet to be transmitted, wherein said receiving one of said packet mode supporting units sends an authorization to said transmitting one of said packet mode supporting units in response to said request; and then transmitting said packet from said transmitting one to said receiving one of said packet mode supporting units;

wherein:

said packet contains first address information;

said communications method further comprises the step of adding additional address information concerning said communications installation to said packet by said transmitting one of said packet mode supporting units; and said additional address information enables said packet to be directed towards a connecting one of said point-to-point links that connects said transmitting one and said receiving one of said packet mode supporting units.

2. A communications method according to claim 1, wherein:

said authorizing step is performed at a moment selected by a collision control process of said receiving one of said packet mode supporting units;

said collision control process resolves contention between each respective said request received from competing ones of said packet mode supporting units; and wherein said competing ones of said packet mode supporting units have performed said requesting step and await said authorization.

3. A communications method according to claim 1, wherein said additional address information is a function of a destination address in said packet; and said communications method further comprises the step of obtaining, at least initially, said additional address information according to the following steps:

interrogating others of said packet mode supporting units of said communications installation, by sending a packet header containing said destination address from said transmitting one to said others of said packet mode supporting units;

determining which of said others of said packet mode supporting units is capable of serving said destination address, wherein each of said others of said packet mode supporting units performs a search to determine a capability of serving said destination address;

indicating that said destination address can be served, by sending a specific authorization from a capable one of said others of said packet mode supporting units to said transmitting one of said packet mode supporting units; and defining said additional address information on a basis of a respective address of said capable one of said others of said packet mode supporting units, and determining said connecting one of said point-to-point links interconnecting said transmitting one and said capable one of said others of said packet mode supporting units.

4. A communications method according to claim 1, further comprising the steps of:

storing, at each of said packet mode supporting units, said additional address information in association with a corresponding destination address; and associating an incoming packet having said stored destination address with said stored additional address information to direct said incoming packet through said communications installation.

5. A communications method according to claim 4, wherein said storing step includes the association of said additional address information with source addresses appearing in said packets.

6. A communications facility comprising:

packet mode supporting units in the core of a communications installation, each of which has an identical respective communication circuit and a respective switching element; and point-to-point links;

wherein said point-to-point links interconnect said packet mode supporting units;

wherein said packet mode supporting units and said point-to-point links define a communications subnetwork;

wherein all of said point-to-point links are physically structured and time governed in identical manner;

wherein each of said packet mode supporting units connects to respective ones of said point-to-point links by said respective communication circuit;

wherein said respective switching element conditions each of a plurality of packets, to be transmitted from a respective one of said packet mode supporting units to another of said packet mode supporting units, to be in the form of a corresponding sequence of cells, and also to ensure packet build up from cells received over any one of said respective ones of said point-to-point links connected to said respective one of said packet mode supporting units;

wherein said respective communication circuit is associated with a supervising processor and with a buffer memory, and includes means for adding additional address information to a first address of any of said plurality of packets to be transmitted; and wherein said respective switching element includes means for directing said corresponding sequence of cells to a corresponding one of said respective ones of said point-to-point links, as a function of said additional address information.

7. A communications facility according to claim 6, wherein:

said respective communication circuit is associated with a communication controller;

said respective communication circuit receives said plurality of packets to be transmitted via said communication controller;

said respective communication circuit transmits packets it has received to said communication controller; and said means for adding additional address information to each of said plurality of packets to be transmitted determines said additional address information on a basis of address information appearing in a header of each of said plurality of packets, and on the basis of information previously provided by an originating one of said packet mode supporting units having a same destination address as said plurality of packets to be transmitted.

8. A communications facility according to claim 7, wherein:

each of said packet mode supporting units includes conflict means for controlling incoming transmissions by others of said packet mode supporting units that are directly connected thereto over said respective ones of said point-to-point links; and each of said others of said packet mode supporting units seeking to transmit to a destination unit of said packet mode supporting units is required to send a request to said destination unit, and to wait for an authorization from said destination unit prior to sending any of said plurality of packets to be transmitted.

9. A communications facility according to claim 8, wherein each of said packet mode supporting units includes means for storing said additional address information in association with a corresponding said packet destination address to enable a received packet having said stored destination address in its header to be directed and allocated without further searching.

10. A communications facility according to claim 9, wherein said means for storing said additional address information in association with a corresponding said destination address also stores said additional address information in association with corresponding source addresses appearing in said packets.

* * * * *